(12) United States Patent
Hunt

(10) Patent No.: US 12,443,418 B1
(45) Date of Patent: *Oct. 14, 2025

(54) DYNAMICALLY-UPDATABLE DEEP TRANSACTIONAL MONITORING SYSTEMS AND METHODS

(71) Applicant: TECH HEIGHTS LLC, Denver, CO (US)

(72) Inventor: Beth Hunt, Denver, CO (US)

(73) Assignee: TECH HEIGHTS LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,889

(22) Filed: May 22, 2024

Related U.S. Application Data

(63) Continuation of application No. 18/464,162, filed on Sep. 8, 2023, now Pat. No. 12,026,523.

(51) Int. Cl.
*G06F 3/00* (2006.01)
*G06F 9/445* (2018.01)
(Continued)

(52) U.S. Cl.
CPC ........ *G06F 9/44521* (2013.01); *G06F 11/302* (2013.01); *G06F 11/3495* (2013.01)

(58) Field of Classification Search
CPC ....................................................... G06F 9/48
See application file for complete search history.

(56) References Cited

U.S. PATENT DOCUMENTS 5,978,828 A * 11/1999 Greer ................... G06F 16/957
709/224
6,819,754 B1 11/2004 Johnson et al.
(Continued)

FOREIGN PATENT DOCUMENTS

| CN | 1790270 A | 6/2006 |
| CN | 105320563 A | 2/2016 |

(Continued)

OTHER PUBLICATIONS

Malik Khan, A Script-Based Autotuning Compiler System to Generate High-Performance CUDA Cod. (Year: 2013).*
(Continued)

*Primary Examiner* — Lechi Truong
(74) *Attorney, Agent, or Firm* — HOLZER PATEL DRENNAN

(57) ABSTRACT

Provided herein are system, method and computer program products for providing dynamically-updatable deep transactional monitoring of running applications in real-time. A method for monitoring a target software application operates by injecting a software engine into a new thread within a target process of the target software application. The method then retrieves a monitoring script and initiates execution of the monitoring script within the software engine. The monitoring script determining the address functions and calls to the functions and inserts a trampoline call within the one or more functions. The trampoline saves the execution state of the target process and calls a corresponding monitoring function that to retrieves data associated with the target process. The method then restoring the execution state of the target process and resumes execution of the target function.

12 Claims, 5 Drawing Sheets

(51) Int. Cl.
*G06F 11/30* (2006.01)
*G06F 11/34* (2006.01)

(56) References Cited

U.S. PATENT DOCUMENTS

| | | |
|---|---|---|
| 7,356,679 B1 | 4/2008 | Le et al. |
| 7,788,537 B1 | 8/2010 | Yellen et al. |
| 8,966,446 B1* | 2/2015 | Amacker ............ G06F 11/3608 |
| | | 717/124 |
| 9,158,512 B1 | 10/2015 | Hucik et al. |
| 9,448,998 B1 | 9/2016 | Bluhm |
| 9,785,489 B1* | 10/2017 | Chheda ............... G06F 9/45558 |
| 9,928,107 B1 | 3/2018 | Mncent |
| 9,996,761 B2* | 6/2018 | Chen ......................... G06T 3/04 |
| 11,489,845 B1* | 11/2022 | Feng ........................ G06F 9/451 |
| 2003/0212926 A1 | 11/2003 | Bhat et al. |
| 2006/0253580 A1 | 11/2006 | Dixon et al. |
| 2014/0053057 A1* | 2/2014 | Reshadi .............. G06F 16/9574 |
| | | 715/234 |
| 2015/0007251 A1 | 1/2015 | Johns |
| 2015/0332043 A1 | 11/2015 | Russello |
| 2016/0117159 A1* | 4/2016 | Balko ................. G06F 9/44526 |
| | | 717/177 |
| 2016/0378611 A1 | 12/2016 | Ljubuncic et al. |
| 2017/0026448 A1 | 1/2017 | Ravindhran et al. |
| 2017/0046518 A1 | 2/2017 | Chen et al. |
| 2019/0034246 A1 | 1/2019 | Miller et al. |
| 2019/0068640 A1 | 2/2019 | Araujo et al. |

FOREIGN PATENT DOCUMENTS

| | | |
|---|---|---|
| CN | 105490868 A | 4/2016 |
| KR | 1005462200000 | 1/2006 |
| WO | 2014016582 A1 | 1/2014 |

OTHER PUBLICATIONS

IBM, AIX Versions 3.2 and 4 Performance Tuning Guide, 2001.
Jang, Moonsu, "Detection of DLL inserted by Windows Malicious Code", 2007.
Kim, Hyoung Chun, "JsSandbox: A Framework for Analyzing the Behavior of Malicious JavaScript Code using internal Function Hooking", 2012.
Kulpa, Artur, et al., "Script-based System for Monitoring Client-side Activity", Business Information Systems, BIS 2006, Conference Paper, Jan. 2006.
Tilkov, Stefan, et al., "Node.js: Using JavaScript to build High-Performance Network Programs", IEEE Computer Society, IEEE Internet Computing, 2010.

* cited by examiner

DYNAMICALLY-UPDATABLE DEEP TRANSACTIONAL MONITORING SYSTEMS AND METHODS

This application claims priority from U.S. Provisional Application 62/656,308 filed on 11 Apr. 2018, U.S. Utility patent application Ser. No. 16/382,174 filed 11 Apr. 2019, U.S. Utility patent application Ser. No. 17/407,034 filed 19 Aug. 2021, now U.S. patent Ser. No. 11/789,752, U.S. Utility patent application Ser. No. 18/464,162 filed 8 Sep. 2023, now U.S. patent Ser. No. 12/026,523 all of which are hereby incorporated by reference in their entirety for all purposes.

BACKGROUND

Embodiments generally relate to software monitoring, and in particular to systems and methods for performing deep transactional monitoring of running applications in production usage.

Software application performance management (APM) is the monitoring and management of the performance and availability of software applications. APM is a crucial part of ensuring software reliability, allowing fast diagnosis and recovery from runtime failures. APM software can be designed to detect and diagnose performance problems in a target application, with the goal of maintaining an expected level of service by the application.

Any set of performance metrics can be monitored by an APM system. One common set of metrics describes the performance experienced by end-users of an application, for example, average response times under peak load. Another common set of metrics measures the computational resources used by the application for a particular load, for example, CPU and memory usage. Computational resource measurements can help discover performance bottlenecks, detect changes in performance, and predict future changes in application performance.

One variant of APM is known as real user monitoring (RUM), which involves passively recording user interaction with an application or client interacting with a server or cloud-based application. Monitoring actual user interaction with a website or an application is important to operators to determine if users are being served quickly and without errors and, if not, which part of a business process is failing. Real user monitoring data is used to determine the actual service-level quality and transactional integrity delivered to end-users and to detect errors or slowdowns on application. The data may also be used to determine if changes that are promulgated to the application have the intended effect or cause errors.

One variant of RUM is known as business transaction monitoring (BTM), which provides tools for tracking the flow of transactions across IT infrastructure and code-level drill-down into defined portions of the transactions, in addition to detection, alerting, and correction of unexpected changes in business or technical conditions. BTM provides visibility into the flow of transactions across infrastructure tiers, including a dynamic mapping of the application topology and deep code-level drill-down in defined portions of the transactions. BTM may allow searching for transactions based on context and content—for instance, the user performing the transaction, time and code context of execution of functions, web requests, or web services, input arguments and return values, and system component executing the transaction, providing a way to isolate causes for issues such as application exceptions, stalled transactions, and lower-level issues such as incorrect data values.

In general, performing APM can be a complicated process that involves many technical challenges. Among them, APM has a performance cost, which can range from minor and negligible to extremely high impact and only suitable for development and non-production environments. Certain methods involve modifying the target application source code and recompiling, but this generally requires suspending and restarting the application. Some APM software may also need access to system resources that may be protected from reading or writing by security measures, for example, requiring administrator/root access. Other applications may block third-party library preloads, further complicating the options to access application data for methods that require modification of system libraries or system preload directives. Many known methods only work on interpreted processes (e.g., coded in Java, Node.js, etc.) but will not work on compiled native processes (e.g., coded in C, C++, etc.). Others depend on frameworks such as .NET or J2EE or profiling APIs such as provided for Java and .NET.

BRIEF DESCRIPTION OF DRAWINGS

The accompanying drawings are incorporated herein and form a part of the specification.

DETAILED DESCRIPTION

Provided herein are system, method and/or computer program product embodiments, and/or combinations and sub-combinations thereof, for providing dynamically updatable deep transactional monitoring of running applications in real-time.

Figure 1:
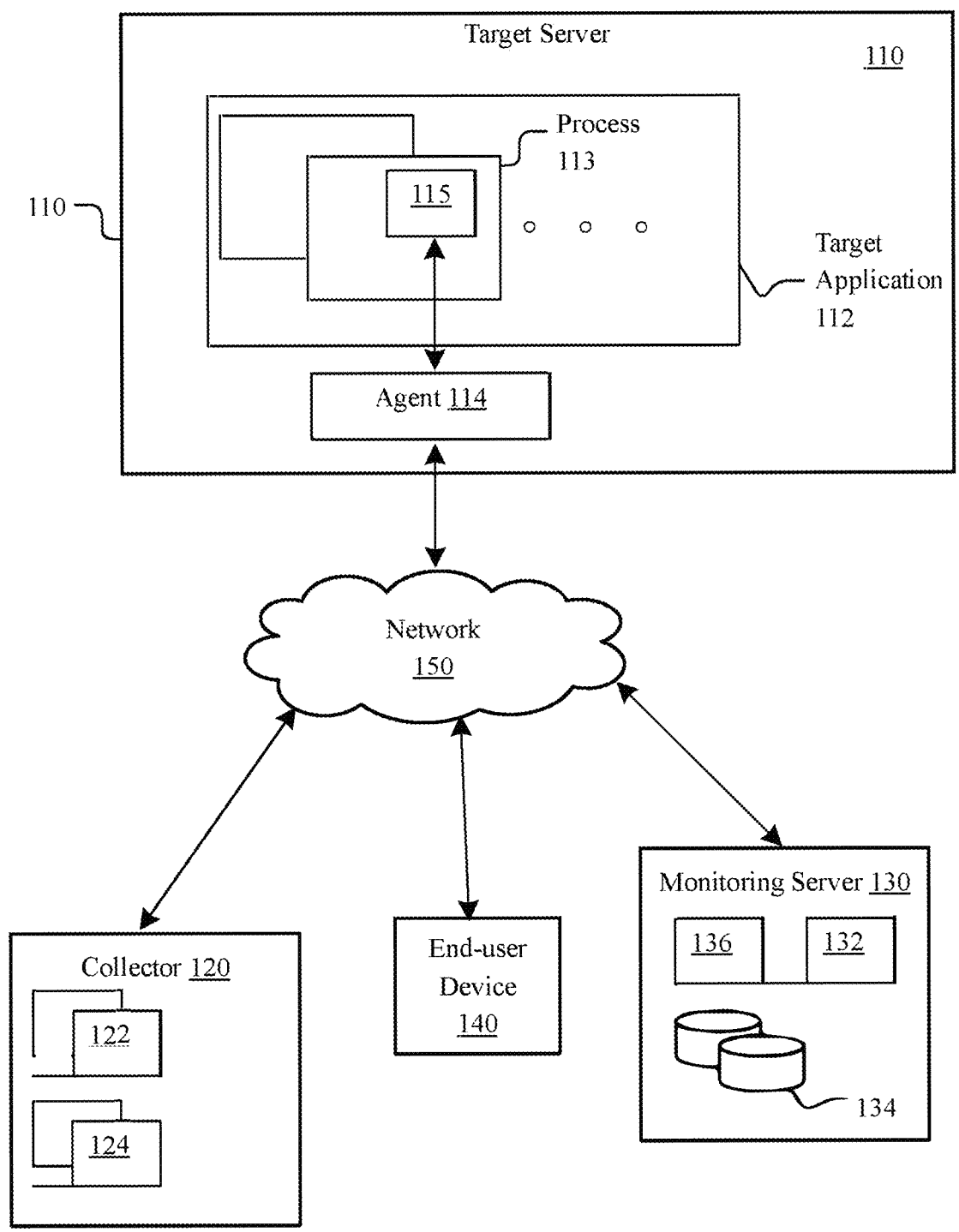
FIG. 1 illustrates a target application monitoring environment, according to an example embodiment.

FIG. 1 illustrates a target application monitoring environment 100, according to an example embodiment. A target application 112 runs on a software environment (e.g., an operating system) running on a target server 110. The target application may be any application, such as, by way of example, a back-end application providing services over a network. In particular embodiments, target application 112 is an application developed in native compiled code (e.g., C/C++). The target application may also be a hosted application or a SaaS application running on a host provider. One or more agents 114 also runs on target server 110, and in particular embodiments, an agent 114 follows an injection approach where it runs as a separate process within target server 110. In another embodiment, the agent 114 follows an embedded approach where it runs inside one or more target processes 113. Agent 114 is configured to collect data from one or more target processes 113 in real-time and transmit the data to monitoring applications. The target application may have one or more agents performing application monitoring.

Agent 114 communicates with a collector server 120 via a network 150. Collector server 120 may run one or more monitoring processes 122 and store one or more monitoring scripts 124. Processes 122 in collector server 120 may be configured to receive monitoring data from agent 114 and control the agent's behavior. For example, agent 114 may receive instructions on what data to collect from target process 113 and how often to collect it.

In particular embodiments following an injection approach, agent 114 creates a new monitoring thread 115 within one or more target processes 113. In an example, agent 114 may inject a Javascript engine (e.g, a Google® V8 engine or a Duktape engine, for example) into the new thread 115. Monitoring thread 115 may run one or more of the monitoring scripts 124 provided by agent 114, in accordance with the instructions received from, for example, monitoring processes 122. In an example, monitoring scripts 124 may be Javascript scripts that are interpreted and executed by the injected Javascript engine. Thread 115 may receive monitoring scripts 124 stored in collector server 120 at runtime, as well as updates and modifications to the scripts, from agent 114 which communicates with collector processes 122 via a suitable communications channel (e.g., SSH tunnel). In this manner, monitoring processes 122 may load monitoring scripts 124 into thread 115 by communicating with agent 114 via the communications channel. New or updated monitoring scripts 124 may be loaded in real-time without the need to restart the target processes.

Collector server 120 may, in turn, communicate with a monitoring server 130 via network 150. The monitoring server may include a controller 132, database 134, and monitoring portal 136. Controller 132 communicates with collector server 120 and provides instructions for configuring the monitoring processes 122 and agents 114 and/or updating the monitoring scripts 124 that will be run inside the process(es) thread(s). Database 134 may receive and store data collected by agent 114 via the monitoring processes 122 running on collector server 120. Monitoring portal 136 may retrieve the data from database 134 and prepare it for presentation at an end-user device 140. In particular embodiments, database 134 may be hosted in monitoring server 130, in a separate system external to the monitoring server 130, or any combination of both. Monitoring portal 136 may generate any suitable application performance monitoring system user interface for display in an end-user device 140. The user interface may provide for controlling data collected, visualizing data, receiving events, and sending alerts, among other functions.

Network 150 may be any communications network or combination of networks suitable for transmitting data between computing devices, such as, by way of example, a Local Area Network (LAN), a Wide Area Network (WAN), Metropolitan Area Network (MAN), Personal Area Network (PAN), the Internet, wireless networks, satellite networks, overlay networks, or any combination thereof. While some embodiments described herein are described within the context of a networked system, it should be understood this disclosure contemplates any combination of networked or non-networked systems. For example, all modules, servers, and processes described herein may run in a single computing system.

End-user device 140 may be any computing device with software suitable for user interface interaction, such as, by way of example, a personal computer, mobile computer, laptop computer, mobile phone, smartphone, personal digital assistant, tablet computer, etc. The user interface may be displayed in any suitable software, such as, by way of example, a standalone application, a web interface, a console interface, etc. Servers 110, 120, and 130 may be any computing device or combination of devices suitable to provide server services, such as, by way of example, server computers, personal computers, database systems, storage area networks, web servers, application servers, etc., or any combination thereof.

Figure 2:
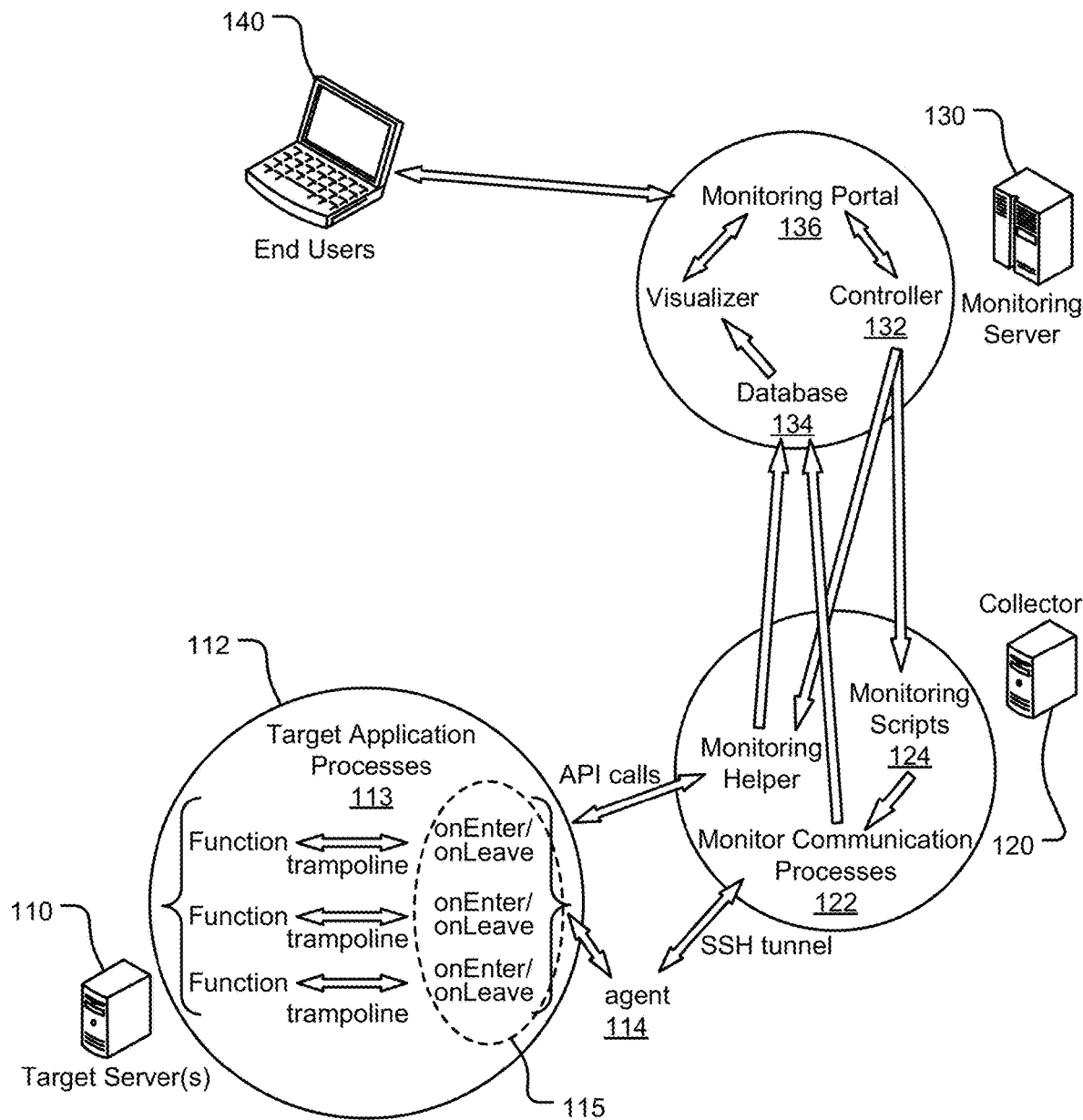
FIG. 2 shows a diagram describing the flow of data in a monitoring environment, according to an example embodiment.

FIG. 2 shows a diagram describing the flow of data in monitoring environment 100, according to an example embodiment. In particular embodiments, the agent 114 attaches to target process 113 and uses a software engine started in thread 115 to run monitoring script(s) 124. The software engine is a runnable component capable of interpreting the monitoring APIs. The engine provides native access to low-level computer architecture. The monitoring scripts may be in low-level languages such as C/C++ or higher-level languages (such as Javascript), and because the monitoring scripts are running in a thread inside the target process, the scripts have access to low-level computer constructs, such as memory locations, execution stack, registers, threads, and to hook functions and call native application and system functions. As an example, the agent may create a monitoring thread 115 to be run within target process 113 that injects a Javascript engine (a Google® V8 engine or a Duktape engine, for example) into the thread. In this example, monitoring thread 115 may run Javascript monitoring scripts 124 that are interpreted and executed by the Javascript engine. The monitoring scripts 124 may in this manner have full access to inspect memory, threads, and registers, and to hook functions and call native application and system functions from inside process 113. By attaching to the process 113 and starting a thread (or, in another embodiment using an embedded approach, being preloaded into the application), the thread has access to create trampolines, as described below.

Agent 114 may use various techniques to obtain transactional monitoring information from target processes 113. In particular embodiments, agent 114 uses an interception approach. Monitoring scripts 124 running in thread 115 may reference one or more functions used by target process 113. Agent 114 may receive instructions specifying which monitoring scripts 124 to be loaded. The monitoring scripts 124 define which functions and what data from the functions to monitor. Agent 114 and/or thread 115 obtain the memory address of the functions to be monitored. Thread 115 then generates a trampoline for calling a monitoring interceptor code (specified for that function within the scripts 124) at certain points in the function's execution by substituting (for example) the first or last instruction in the targeted function for an instruction that calls the monitoring interceptor code within a monitoring script 124. In this embodiment, the interceptor code updates stacks and registers to the pre-interception status prior to returning execution back to the target function.

Figure 3A:
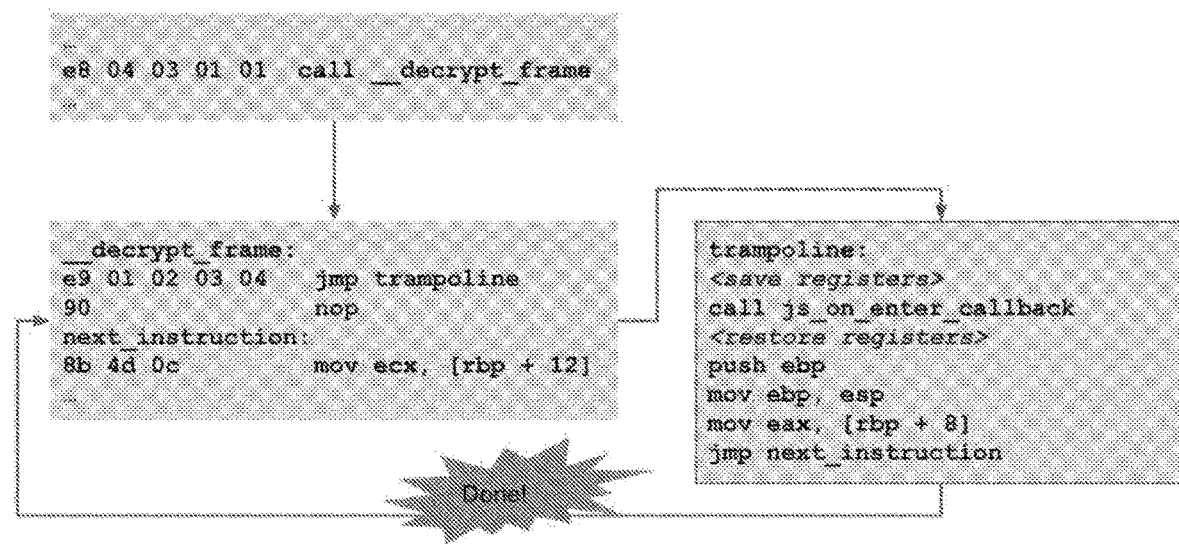
FIG. 3A shows a set of instructions illustrating how a thread may create a trampoline to a monitoring function, according to an example embodiment.

FIG. 3A shows a set of instructions illustrating how a thread 115 may create a trampoline to a monitoring function, according to an example embodiment. A target process 113 may at some point in execution call a function called "decrypt_frame." Monitoring scripts 124 specifying this function may have been inserted into thread 115 by agent 114 per instructions sent from monitoring collector 120. Thread 115 may thus substitute the first instruction in the function "decrypt_frame" for a trampoline instruction, as shown by instruction "jmp trampoline," which transfers execution to the block labeled "trampoline." Thus, each time the function "decrypt_frame" is called, the execution runs into the trampoline. The trampoline function may then save the state of the stack and registers and call monitoring interceptor code within the monitoring script 124 (e.g., Javascript script) that may perform the desired monitoring for the monitoring system. For example, the script 124 may record the time the "decrypt_frame" instruction was called, the value of input arguments received by the function, and any other data relevant to monitor the state or performance of the application. The information to be monitored may ultimately be configured by the rest of the monitoring system based on end-user instructions. Once the monitoring data has been stored or sent, the trampoline restores the registers to the original values before the trampoline call. Thread 115 may insert a trampoline in this manner at any point in execution, not just at the beginning of a function. As an example, thread 115 may replace the return instruction of a function with a trampoline that may collect, for example, the time the function ended and the return values. In this manner, thread 115 may collect the execution time of a function based on the time the function started and ended, and thus allow monitors to assess the performance of the function and process.

Agent 114 may communicate via bi-directional communication channels with monitor communication processes 122 and monitoring scripts 124 running on threads 115. As an example, the communication channels may be one or more SSH tunnels, thus maintaining the security of sensitive target application data. Agent 114 may transmit the data collected by monitoring scripts 124, and receive configuration and instructions for what functions to monitor, what data to collect, and at what points in the functions to collect the data.

In particular embodiments, monitoring scripts 124 may directly find function pointers to a specific application function of target process 113 and execute them. The scripts may retrieve data or results from the function's execution and store and/or transmit the data, e.g., for monitoring purposes. As an example, agent 114 may communicate the function execution data to collector 120.

The interception approach has numerous benefits. For example, it does not require access to the target application source code nor root/administrator-level permissions. The approach allows monitoring to be enabled/disabled and modified in real-time without the need to restart the application. As implemented/optimized, it has minimal performance or system impact and does not require source code instrumentation, modification, or compilation. Furthermore, this approach can be used on applications that block third-party library preloads and/or do not utilize shared resources, and thus allows transactional monitoring of these applications. It can monitor both application and system functions as well as both static or non-static functions. Finally, this approach works for compiled native processes (coded in C, C++, etc.) as well as interpreted processes (coded in Java, Node.js, etc.)

In particular embodiments, agent 114 uses an embedded approach for monitoring, as mentioned earlier. In this scenario, the target process 112 is modified by embedding a library into the code through suitable means, such as, for example, source code modification, patching, or preloading. In particular embodiments, agent 114 is then loaded into and run in a separate new thread within target process 113, as opposed to a new process. In other embodiments, agent 114 may be embedded into the process. This loading is performed after the dynamic linker executes its constructor. The agent 114 then creates the thread 115, which then directly communicates with monitoring communication processes in collector 120, for example, via an SSH tunnel. The embedded approach also provides the option of storing the monitoring scripts 124 directly on the target system (as shown by dashed box 124 in FIG. 1) for autonomous application by the embedded agent. Modifications to these stored monitoring scripts 124 can be applied in real-time to running processes. The embedded approach may be useful in scenarios when access to source code, patch, or pre-loading is available.

In particular embodiments, agent 114 uses a stalker approach for monitoring. The stalker approach may be useful in scenarios where the target application has strict in-app self-checking and the previously described approaches may not work. In the stalker approach, an agent intercepts function calls in target process 113 and splits them into basic blocks. A basic block is a straight-line code sequence with no branches-in except to the entry and no branches-out except at the exit. This restricted form makes a basic block highly amenable to analysis. Compilers usually decompose programs into their basic blocks as a first step in the analysis process.

Figure 3B:
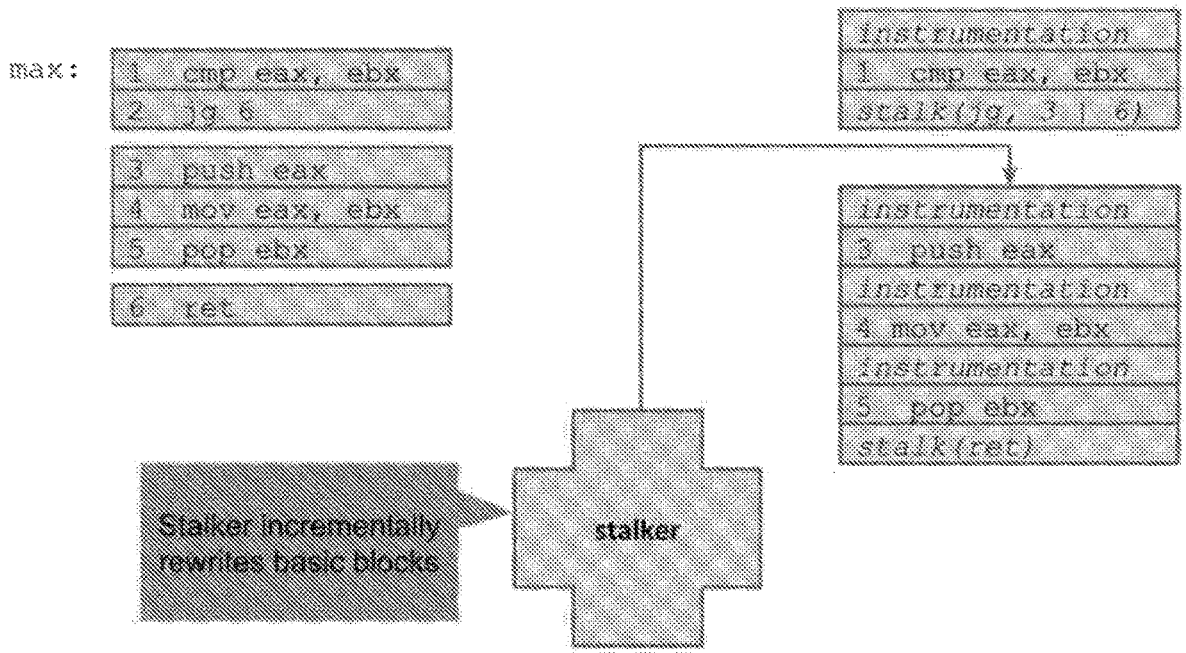
FIG. 3B shows a set of instructions illustrating the stalker approach adds instrumentation to target functions, according to an example embodiment.
Figure 3B:
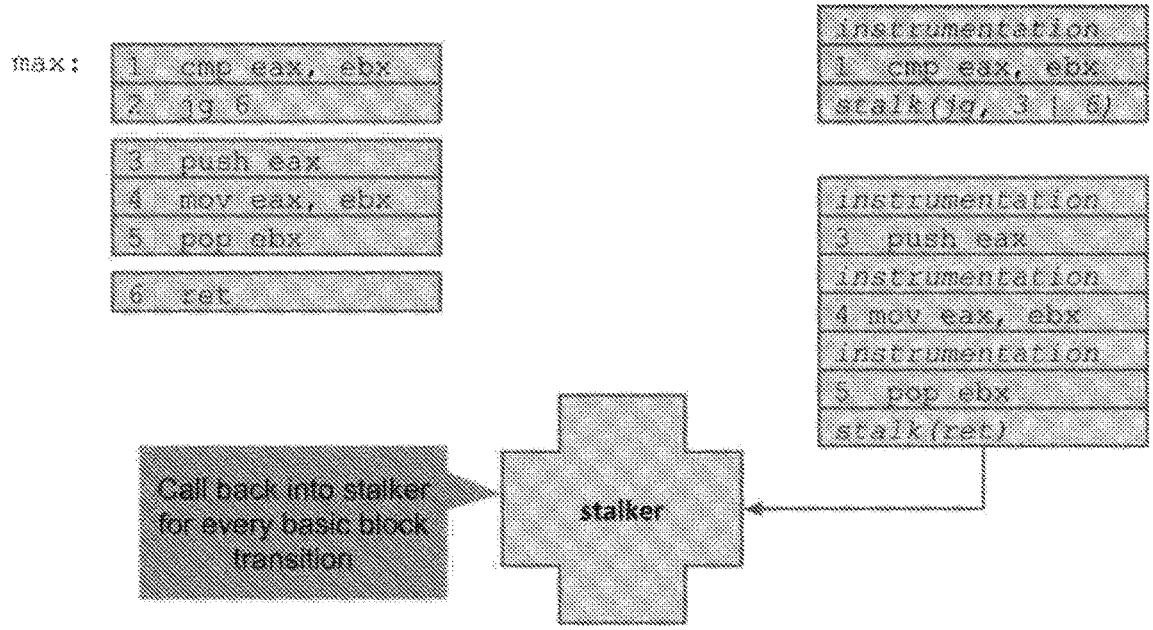

FIG. 3B shows a set of instructions illustrating the stalker approach adds instrumentation to target functions, according to an example embodiment. Each instruction is wrapped in instrumentation and a call back to stalker monitoring functions is made at every block transition. Stalker agent 114 incrementally rewrites basic blocks, adding instrumentation and the call back into monitoring functions at every basic block transition. By using this approach there is no stack modification, no register modification, and can be used in cases where the application code is self-modifying and self-checking (e.g., with checksums). The system can specify which functions are followed (as opposed to whole-program dynamic binary instrumentation alternatives) and can also add custom updates and synchronous callbacks through the use of the software engine (e.g., Javascript engine).

The stalker approach has numerous benefits. As with the interception approach, it does not require access to the target application source code nor root/administrator-level permissions. The approach allows monitoring to be enabled/disabled and modified in real-time without the need to restart the application. As implemented/optimized, it has minimal performance or system impact and does not require source code instrumentation, modification, or compilation. Furthermore, this approach can be used on applications that block third-party library preloads and/or do not utilize shared resources, and thus allows transactional monitoring of these applications. It can monitor both application and system functions as well as both static or non-static functions. Finally, this approach works for compiled native processes (coded in C, C++, etc.) as well as interpreted processes (coded in Java, Node.js, etc.)

Figure 4:
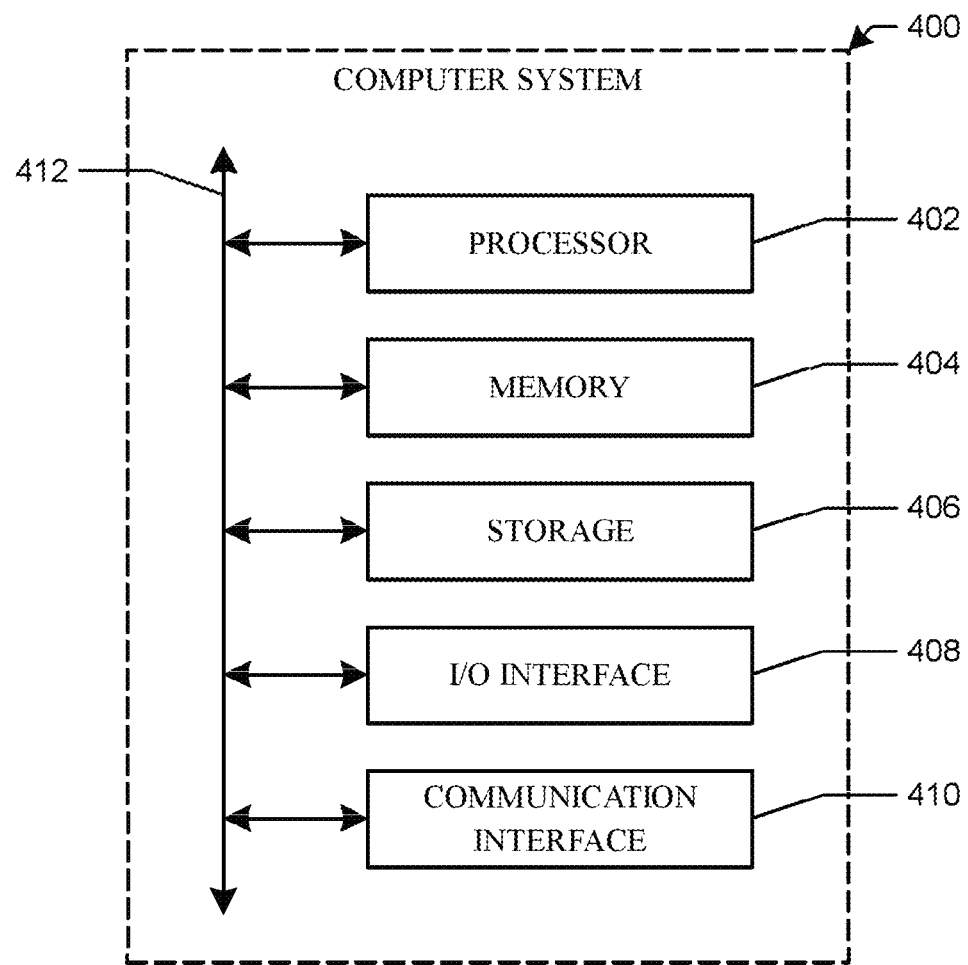
FIG. 4 is an example computer system useful for implementing various embodiments.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. For example, computer system 400 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, one or more computer systems 400 may perform in real-time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, computer system 400 may load instructions from storage 406 or another source (such as another computer system 400) to memory 404. Processor 402 may then load the instructions from memory 404, execute the instructions, write one or more results to memory 404. In particular embodiments, memory 404 includes volatile memory, such as random access memory (RAM).

In particular embodiments, storage 406 includes mass storage for data or instructions. As an example, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, an I/O device may include a keyboard, keypad, microphone, monitor, mouse, printer, scanner, speaker, still camera, stylus, tablet, touch screen, trackball, video camera, another suitable I/O device, or a combination of two or more of these. An In particular embodiments, communication interface 410 includes hardware, software, or both providing one or more interfaces for communication (such as, for example, packet-based communication) between computer system 400 and one or more other computer systems 400 or one or more networks. As an example, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless.

In particular embodiments, bus 412 includes hardware, software, or both coupling components of computer system 400 to each other. As an example, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, computer system 400 may be configured to run an operating system software. An operating system manages computer system hardware and software resources and provides common services for computer programs. Modern operating systems are multitasking operating systems, which allow more than one program to run concurrently. The operating system may use time-sharing of available processor time by dividing the time between multiple processes. A process is an instance of a computer program that is being executed, containing the program code and its current activity. These processes are each interrupted repeatedly in time slices by a task-scheduling subsystem of the operating system. In particular embodiments, the operating system also allows the implementation of multiple threads of execution running within a process. A thread of execution (or simply a thread) is a smaller sequence of programmed instructions that is managed by a scheduling subsystem, and forms a component of a process. In general, multiple threads can exist within one process and share resources such as memory, while different processes may not share these resources. In particular, the threads of a process may share its executable code and the values of its variables at any given time.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments but should be defined only in accordance with the following claims and their equivalents.

What is claimed is:

1. A computer-implemented method of modifying a target application executing in a target process including one or more target threads, the computer-implemented method comprising:
   creating a monitoring thread in the target process different than the one or more target threads during runtime of the target process;
   starting execution of a software engine in the monitoring thread in the target process, during the runtime of the target process, to execute one or more monitoring scripts during the runtime of the target process, wherein the one or more monitoring scripts executing in the monitoring thread are configured to access memory within the target process and the target application executing in the one or more target threads are configured to access the memory within the target process;
   modifying, by execution of the one or more monitoring scripts, executable code of the target application during the runtime of the target process, wherein the modified executable code is configured to generate monitoring data from the runtime of the target process and to store the monitoring data into the memory during the runtime of the target process, wherein the modifying operation includes modifying one or more instructions in a target function of the target application during runtime of the target process to include instructions that call monitoring interceptor code within the one or more monitoring scripts; and
   accessing, by the one or more monitoring scripts in the monitoring thread, the monitoring data in the memory after the monitoring data is stored into the memory.

2. The computer-implemented method of claim 1, further comprising:
   updating the one or more monitoring scripts from a source external of the target process without restarting the target process.

3. The computer-implemented method of claim 1, wherein the one or more monitoring scripts identify one or more functions of the target application to monitor and data from the one or more functions to monitor.

4. The computer-implemented method of claim 1, wherein the one or more monitoring scripts send monitored data to an agent external of the target process.

5. A computerized system for modifying a target application executing in a target process including one or more target threads, the computerized system comprising:
   memory configured to store executable program code and data; and
   at least one hardware processor configured to create a monitoring thread in the target process different than the one or more target threads during runtime of the target process, execute a software engine in the monitoring thread in the target process, during the runtime of the target process, to execute one or more monitoring scripts during the runtime of the target process, wherein the one or more monitoring scripts executing in the monitoring thread are configured to access the memory within the target process and the target application executing in the one or more target threads are configured to access the memory within the target process, modify, by execution of the one or more monitoring scripts, executable code of the target application during the runtime of the target process, wherein the modified executable code is configured to generate monitoring data from the runtime of the target process and to store the monitoring data into the memory during the runtime of the target process, and access, by the one or more monitoring scripts in the monitoring thread, the monitoring data in the memory after the monitoring data is stored into the memory, wherein the at least one hardware processor modifies one or more instructions in a target function of the target application during runtime of the target process to include instructions that call monitoring interceptor code within the one or more monitoring scripts.

6. The computerized system of claim 5, wherein the at least one hardware processor further updates the one or more monitoring scripts from a source external of the target process without restarting the target process.

7. The computerized system of claim 5, wherein the one or more monitoring scripts identify one or more functions of the target application to monitor and data from the one or more functions to monitor.

8. The computerized system of claim 5, wherein the one or more monitoring scripts send monitored data to an agent external of the target process.

9. One or more tangible non-transitory processor-readable storage media embodied with instructions for executing on one or more processors and circuits of a computing device a process for modifying a target application executing in a target process including one or more target threads, the process comprising:
   creating a monitoring thread in the target process different than the one or more target threads during runtime of the target process;
   starting execution of a software engine in the monitoring thread in the target process, during the runtime of the target process, to execute one or more monitoring scripts during the runtime of the target process, wherein the one or more monitoring scripts executing in the monitoring thread are configured to access memory within the target process and the target application executing in the one or more target threads are configured to access the memory within the target process;
   modifying, by execution of the one or more monitoring scripts, executable code of the target application during the runtime of the target process, wherein the modified executable code is configured to generate monitoring data from the runtime of the target process and to store the monitoring data into the memory during the runtime of the target process, wherein the modifying operation includes modifying one or more instructions in a target function of the target application during runtime of the target process to include instructions that call monitoring interceptor code within the one or more monitoring scripts; and
   accessing, by the one or more monitoring scripts in the monitoring thread, the monitoring data in the memory after the monitoring data is stored into the memory.

10. The one or more tangible non-transitory processor-readable storage media of claim 9, further comprising:
    updating the one or more monitoring scripts from a source external of the target process without restarting the target process.

11. The one or more tangible non-transitory processor-readable storage media of claim 9, wherein the one or more monitoring scripts identify one or more functions of the target application to monitor and data from the one or more functions to monitor.

12. The one or more tangible non-transitory processor-readable storage media of claim 9, wherein the one or more monitoring scripts send monitored data to an agent external of the target process.

\* \* \* \* \*